United States Patent
Rao et al.

(10) Patent No.: US 10,338,829 B2
(45) Date of Patent: Jul. 2, 2019

(54) MANAGING MULTIPATH CONFIGURATON IN DATA CENTER USING REMOTE ACCESS CONTROLLER

(71) Applicant: DELL PRODUCTS, L.P., Round Rock, TX (US)

(72) Inventors: Balaji Bapu Gururaja Rao, Austin, TX (US); Chidambara M. Shashikiran, Cedar Park, TX (US); Steven R. Lemons, Leander, TX (US); Elie A. Jreij, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 238 days.

(21) Appl. No.: 15/588,424

(22) Filed: May 5, 2017

(65) Prior Publication Data

US 2018/0321861 A1    Nov. 8, 2018

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0635* (2013.01); *G06F 3/0665* (2013.01); *G06F 3/0643* (2013.01)

(58) Field of Classification Search
None
See application file for complete search history.

(56) References Cited

U.S. PATENT DOCUMENTS

| | | | |
|---|---|---|---|
| 7,275,103 B1 * | 9/2007 | Thrasher | H04L 45/22 709/223 |
| 7,406,039 B2 | 7/2008 | Cherian et al. | |
| 7,831,761 B2 * | 11/2010 | Phelan | G06F 9/45558 710/38 |
| 8,041,987 B2 | 10/2011 | Allen et al. | |
| 8,473,592 B2 * | 6/2013 | Masuda | H04L 67/1097 709/203 |
| 8,838,848 B2 | 9/2014 | Zhang et al. | |
| 8,990,800 B2 | 3/2015 | Cherian et al. | |
| 9,015,457 B2 | 4/2015 | Nadon et al. | |
| 9,112,794 B2 | 8/2015 | Agarwal et al. | |
| 9,146,812 B2 * | 9/2015 | Zhang | G06F 11/1415 |
| 9,413,668 B2 | 8/2016 | Venkataswami et al. | |

(Continued)

*Primary Examiner* — Elias Mamo
(74) *Attorney, Agent, or Firm* — Isidore PLLC

(57) ABSTRACT

A remote access controller (RAC) service module performs a method of configuring an information handling system (IHS) to adaptively access a multipath storage area network (SAN). A RAC of the RAC service module receives an out-of-band communication containing a multipath solution from a management console. The RAC stores the multipath solution in persistent memory accessible to the RAC. The RAC, via a RAC service manager operating with an operating system of a host processor subsystem of the IHS, accesses system dependent multipath configuration (SDMC) file(s) in host system storage. The RAC creates system independent multipath configuration (SIMC) file(s) based on the multipath solution and the SDMC file(s). The RAC causes the RAC service manager to store the SIMC file(s) in system storage. The method includes triggering a system dependent multipath agent of the host operating system to configure multipath access to the SAN according to the SDMC and SIMC files.

18 Claims, 4 Drawing Sheets

(56) References Cited

U.S. PATENT DOCUMENTS

| | | |
|---|---|---|
| 9,430,208 B2 | 8/2016 | Nadon et al. |
| 9,483,331 B1 | 11/2016 | Bijoy et al. |
| 2002/0004883 A1* | 1/2002 | Nguyen ............... G06F 3/0613 <br> 711/111 |
| 2002/0196744 A1* | 12/2002 | O'Connor ............... H04L 29/06 <br> 370/254 |
| 2014/0177455 A1* | 6/2014 | Astigarraga .......... H04W 24/06 <br> 370/252 |
| 2016/0378342 A1 | 12/2016 | Beckman et al. |
| 2017/0102952 A1 | 4/2017 | Khemani et al. |

\* cited by examiner

MANAGING MULTIPATH CONFIGURATON IN DATA CENTER USING REMOTE ACCESS CONTROLLER

BACKGROUND

1. Technical Field

The present disclosure relates in general to management of storage resources of an information handling system (IHS), and more particularly to management of multipath configuration of storage resources of an IHS.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

To provide high availability, IHSs are often configured for redundant storage resources of storage area networks (SANs) and storage appliances that are reached by "multi-pathing". In IHS storage, multipath input/output (I/O) or multipathing involves providing more than one physical path between host operating system (OS) and storage resources, such as SANs and storage appliances, that are used by the host OS as part of a storage area network (SAN). Multipathing provides fault tolerance, load balancing, and redundancy between server and SAN components by providing multiple paths by which the IHS can access advertised resources from storage appliances. Most operating systems provide some native framework to harness the multipathing capability of the connected storage system. However, configuring multipathing on different storage configurations coupled with a variety of operating system is a herculean task for system administrators. Different operating systems provide different ways and methods to configure multipath I/O on a variety of storage systems. Also different storage systems manage paths to a storage logical unit numbers (LUN) in different ways. Configuring multipath I/O thus requires proficiency on how the different OSs provide for multipathing to different SANs. Any change in SAN or OS requires a change in configuration and hence a thorough knowledge of different multipath software and frameworks across a variety of operating systems.

A data center will include storage from multiple vendors and have hundreds of servers running various operating systems. Today, there is no standard way of configuring multipath configurations on various operating systems. The datacenter administrator will need to have a detailed understanding of multipath configurations on each type of OS and storage, which is almost impossible to manage.

BRIEF SUMMARY

In accordance with the teachings of the present disclosure, an information handling system (IHS) includes a network interface in communication with a management console via a network. A host processor subsystem is in communication with the network interface and host system storage. The host processor subsystem executes a system dependent (SD) multipath agent of an operator system to configure multipath access to a storage area network (SAN). The SD multipath agent configures multipathing according to one or more system dependent multipath configuration (SDMC) files and any system independent multipath configuration (SIMC) files that may be contained within the host system storage. The IHS has a remote access controller (RAC) service module that includes persistent storage that is separate from the system storage, and includes a RAC. The RAC is coupled to: (i) the persistent storage; (ii) the system storage via a RAC service manager executed by the host processor subsystem; and (iii) the network interface to perform out-of-band processing for the IHS. The RAC includes a service processor which executes a system independent (SI) multipath agent. The SI multipath agent causes the RAC to receive an out-of-band communication containing a multipath solution from the management console. The RAC stores the multipath solution in the persistent memory. The RAC accesses the one or more SDMC files in the system storage. The RAC creates the one or more SIMC files based on the multipath solution and the one or more SDMC files. The RAC stores the one or more SIMC files in the system storage. The RAC triggers the SD multipath agent to configure access to the SAN according to the one or more SDMC and SIMC files configured for host access.

In accordance with embodiments of the present disclosure, a method is provided of remotely configuring an IHS to adaptively access a multipath SAN. In one or more embodiments, the method includes receiving, by a RAC of an IHS, an out-of-band communication containing a multipath solution from a management console. The RAC stores the multipath solution in persistent memory accessible to the RAC. The method includes accessing SDMC file(s) in system storage that is separate from the persistent storage and that is accessible by an SD multipath agent of an operating system. The RAC creates SIMC file(s) based on the multipath solution and the SDMC file(s). The method includes storing the SIMC file(s) in the system storage. The method includes triggering a SD multipath agent to configure access to the SAN according to the one or more SDMC and SIMC files.

According to illustrative embodiments of the present disclosure, RAC service module of an IHS includes a persistent storage that is separate from a system storage of the IHS. The RAC service module includes a remote access controller (RAC) coupled to: (i) the persistent storage; (ii) a system storage via a RAC service manager executed by a host processor subsystem of the IHS; and (iii) a network interface of the IHS to perform out-of-band processing for the IHS. The RAC has a service processor which executes a SI multipath agent that causes the RAC to receive an out-of-band communication containing a multipath solution from a management console over a network via the network interface. The RAC stores the multipath solution in the persistent memory. The RAC accesses the one or more SDMC files in the system storage. The RAC creates the one or more SIMC files based on the multipath solution and the one or more SDMC files. The RAC stores the one or more SIMC files in the system storage. The RAC triggers a SD multipath agent of a host operating system and executed by the host processor subsystem to configure access to a storage area network (SAN) according to the one or more SDMC and SIMC files.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
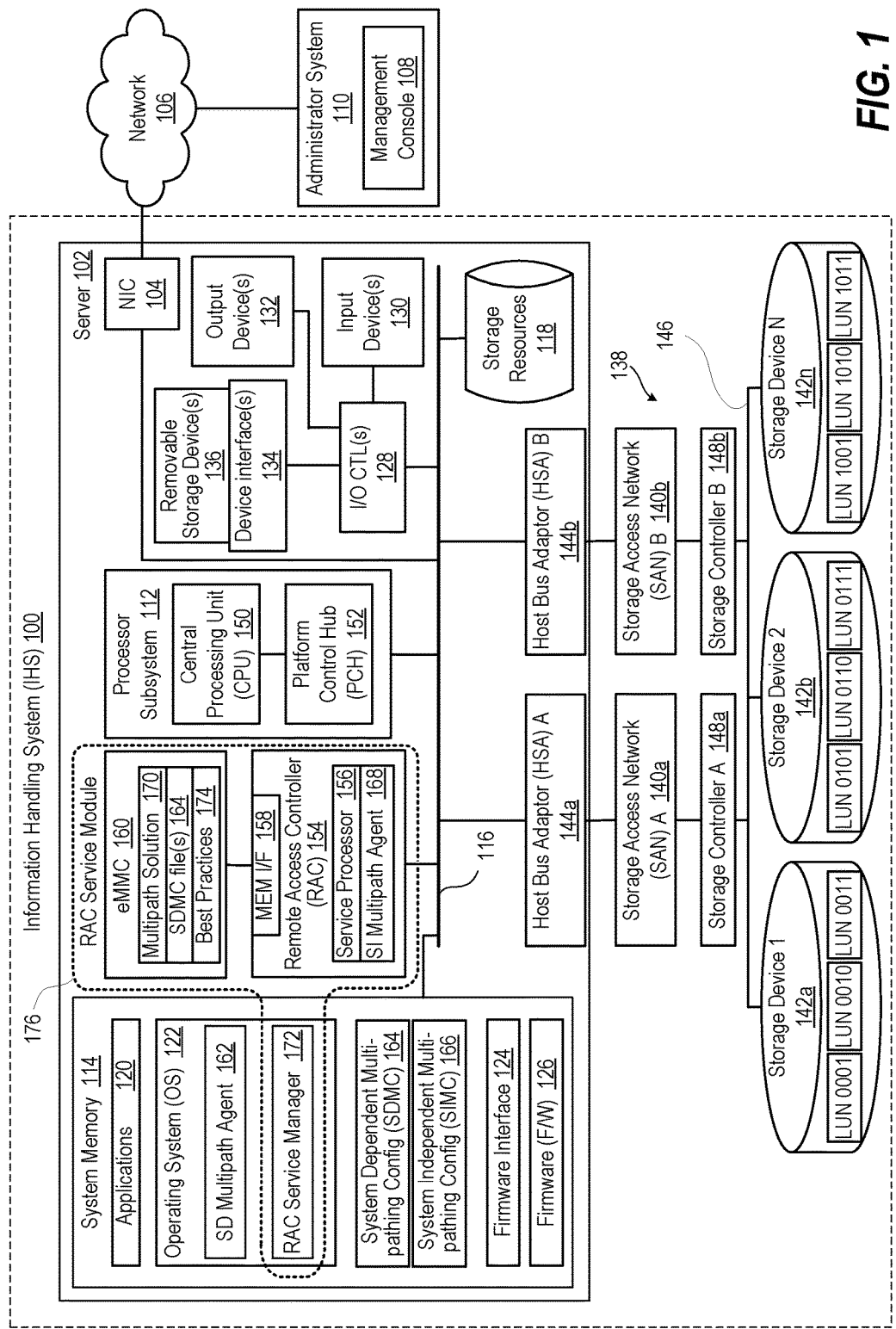
FIG. 1 illustrates a block diagram representation of an example information handling system (IHS) having adaptively and remotely configured multipath access to a storage area network (SAN), according to one or more embodiments.

According to the described embodiments, a remote access controller (RAC) service module performs a method of configuring an information handling system (IHS) to adaptively access a multipath storage area network (SAN). In one or more embodiments, the IHS facilitates management of multipath configurations in a datacenter using a RAC. The RAC receives an out-of-band communication containing a multipath solution from a management console. The RAC stores the multipath solution in persistent memory accessible to the RAC. The RAC, via a RAC service manager operating with an operating system of a host processing subsystem of the IHS, accesses system dependent multipath configuration (SDMC) file(s) in host system storage that is separate from the persistent storage. The RAC creates system independent multipath configuration (SIMC) file(s) based on the multipath solution and the SDMC file(s). The RAC causes the RAC service manager to store the SIMC file(s) in the host system storage. The method includes triggering a system dependent multipath agent of the host operating system to configure multipath access to the SAN according to the SDMC and SIMC files.

The present disclosure introduces a method to automatically deploy multipath configurations on a group of servers. Datacenter administrators can chose a set of servers for deployment of multipath configurations on all the servers using a single step and thereby save a significant amount of time, while also reducing human errors.

Monitoring the multipath configuration is a huge challenge in a conventional datacenter consisting of many servers and storage arrays. The present disclosure provides a single tool that can be used to deploy and also monitor the configuration, which provides a huge benefit for a datacenter administrator.

The present disclosure provides a single application or tool that can completely automate multipath configuration in a datacenter environment ensuring that datacenter administrators achieve optimal performance. The automated process executed by the RAC can customize and fine tune the multipath configuration settings on the operating system based on the type of storage being presented. The fine-tuned multipath configuration ensures optimized performance and reduction in support calls, which in turn will result with better user experience for the customer. The present innovation is OS agnostic. The present innovation provides remotely triggered RAC service modules that simplifies and automates multipath configurations on multiple servers with varying operating systems while ensuring industry standard best practices on the configuration of multipathing extents is followed.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example IHS 100 having server 102 that includes a network interface, depicted as a network interface controller (NIC)

104, in communication via a network 106 with a management console 108 of an administrator system 110. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal digital assistant (PDA), a consumer electronic device, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 1, a host processor subsystem 112 is coupled to system memory 114 via system interconnect 116. System interconnect 116 can be interchangeably referred to as a system bus, in one or more embodiments. System interconnect 116 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. For the purpose of this disclosure, system interconnect 116 can also be a Double Data Rate (DDR) memory interface. The system memory 114 can either be contained on separate removable dual inline memory module (RDIMM) devices or system memory 114 can be contained within persistent memory devices (NVDIMMs). For example, the NVDIMM-N variety of NVDIMMs contain both random access memory, which can serve as system memory, and non-volatile memory. It should be noted that other channels of communication can be contained within system interconnect 116, including but not limited to i2c or system management bus (SMBus). System interconnect 116 communicatively couples various system components including, for example, replaceable local storage resources 118 such as solid state drives (SDDs) and hard disk drives (HDDs) within which can be stored one or more software and/or firmware modules and one or more sets of data that can be utilized during operations of management IHS 100. Specifically, in one embodiment, system memory 114 can include therein a plurality of such modules, including one or more of application(s) 120, operating system (OS) 122, a firmware interface 124 such as basic input/output system (BIOS) or Uniform Extensible Firmware Interface (UEFI), and platform firmware (FW) 126. These software and/or firmware modules have varying functionality when their corresponding program code is executed by host processor subsystem 112 or secondary processing devices within management IHS 100. For example, application(s) 120 may include a word processing application, a presentation application, and a management station application, among other applications.

IHS 100 further includes one or more input/output (I/O) controllers 128 that support connection by and processing of signals from one or more connected input device/s 130, such as a keyboard, mouse, touch screen, or microphone. I/O controllers 128 also support connection to and forwarding of output signals to one or more connected output devices 132, such as a monitor or display device or audio speaker(s). Additionally, in one or more embodiments, one or more device interfaces 134, such as an optical reader, a universal serial bus (USB), a card reader, Personal Computer Memory Card International Association (PCMCIA) slot, and/or a high-definition multimedia interface (HDMI), can be associated with IHS 100. Device interface(s) 134 can be utilized to enable data to be read from or stored to corresponding removable storage device/s 136, such as a compact disk (CD), digital video disk (DVD), flash drive, or flash memory card. In one or more embodiments, device interface(s) 134 can further include general purpose I/O interfaces such as inter-integrated circuit ($I^2C$), system management bus (SMB), and peripheral component interconnect (PCI) buses.

NIC 104 enables IHS 100 and/or components within IHS 100 to communicate and/or interface with other devices, services, and components that are located external to IHS 100, represented as network devices such as administrator system 110. These devices, services, and components can interface with IHS 100 via an external network, such as example network 106, using one or more communication protocols that include transport control protocol (TCP/IP) and network block device (NBD) protocol. Network 106 can be a local area network, wide area network, personal area network, and the like, and the connection to and/or between network and IHS 100 can be wired, wireless, or a combination thereof. For purposes of discussion, network 106 is indicated as a single collective component for simplicity. However, it should be appreciated that network 106 can comprise one or more direct connections to other devices as well as a more complex set of interconnections as can exist within a local area network or a wide area network, such as the Internet.

Remote and highly available storage is provided by a storage system 138 that includes storage area networks (SANs) 140a, 140b. Each SAN 140a, 140b is a high-speed network of shared storage systems, depicted as storage devices 142a, 142b, 142n. SANs 140a, 140b may be used to provide centralized data sharing, data backup, and storage management. Although a SAN 140a, 140b may include multiple servers and multiple storage systems, for clarity the server 102 is a single server having two host bus adapters (HBAs) 144a, 144b coupled to the single storage system 138 having storage devices 142a, 142b, 142n. Server 102 and storage system 138 are coupled to one another across a switching network 146. Switching network 146 is coupled to server 102 through the HBAs 144a, 144b. The storage units or logical unit numbers (LUNs) of the storage system 138 are accessed through the ports and storage controllers 148a, 148b of the storage system 138.

Host processor subsystem 112 can include a central processing unit (CPU) 150 that is augmented by a platform control hub (PCH) 152. The PCH 152 interfaces to functional components of the IHS 100 such as a baseboard management controller (BMC) depicted as a remote access controller (RAC) 154. In one or more embodiments, a specialized service processor 156 of the RAC 154 performs BMC functionality. For example, the RAC 154 monitors the physical state of a computer, network server or other hardware device such as server 102 using sensors and communicating with a system administrator through an independent connection, such as NIC 104. As a non-limiting example, RAC 154 can be an improved integrated Dell Remote Access Controller (iDRAC) from Dell® that supports the additional multipath functionality described herein. The iDRAC has the ability to edit/create files locally to itself. The iDRAC also has the ability to see OS specific files. The iDRAC can keep best practice configuration files locally while being a control node executing and feeding an OS specific process when finalizing OS multipath input/output (MPIO) configuration file(s). RAC 154 performs out-of-band communication for the IHS 100 via the NIC 104 and network 106 to a network device, such as a management console 108 on administrator system 110. RAC 154 can have access, via a memory interface (I/F) 158, to a persistent storage device, such as an embedded multimedia card (eMMC) 160, which is local memory. The eMMC 160 is a flash memory and controller packaged into a small ball grid array (BGA) integrated circuit (IC) package for use in circuit boards as an embedded non-volatile memory system. eMMC 160 is separate from the system memory 114.

The host processor subsystem 112 executes a system dependent (SD) multipath agent 162 of an operator system (OS) 122 to configure multipath access to storage area networks (SANs) 140a, 140b according to system dependent multipath configuration (SDMC) file(s) 164 and any system independent multipath configuration (SIMC) file(s) 166 contained in the system memory 114. RAC 154 executes a system independent (SI) multipath agent 168 that receives an out-of-band communication containing a multipath solution 170 from the management console 108. SI multipath agent 168 stores the multipath solution 170 in the eMMC 160. SI multipath agent 168 accesses the SDMC file(s) 164 in the system memory 114 via a RAC service manager 172 executed with the OS 122. SI multipath agent 168 creates the SIMC file(s) 166 based on the multipath solution 170 and the SDMC file(s) 164. RAC 154 can be provisioned with vendor-specific best practices 174 that can be utilized to optimize the SIMC file(s) 166 in executing the multipath solution 170. RAC service manager 172 executed by host processor subsystem 112 stores the SIMC file(s) 166 in the system memory 114. RAC service manager 172 triggers the SD multipath agent 162 to configure access to the SANs 140a, 140b according to the SDMC and SIMC files 164, 166. A RAC service module 176 is formed by the RAC 154, eMMC 160 and a distributed assistance from RAC service manager 172 to perform as a remotely triggered multipathing agent.

In an exemplary embodiment, the multipath solution 170 at a minimum includes the following inputs: (i) number of HBAs 144a, 144b available for multipathing; (ii) number of network controllers available for multipathing; (iii) multipathing policies (fixed, round robin, most recently used, etc.); (iv) knowledge of local OS utilities to identify World Wide Names (WWNs) of the presented SAN volumes; and (v) default timeout values. Once the above information is provided, the SI multipath agent 168 creates a set of configuration files that are consumed by the SD multipathing agent 162. These configuration files or entities are specific to operating systems that provide multipathing. However the configuration files are established by vendor-specific best practices. The SD multipath agent 162 handles the fault tolerance or availability of the storage logical unit number (LUN) itself. According to one aspect, since the SI multipath agent 168 does not have to understand the idiosyncrasies of the connected storage, the SI multipath agent 168 can reside on the baseboard management controller (BMC). In the present innovation, the SI multipath agent 168 is supported by the RAC service module. The RAC service manager acts as a single point of configuration for multipathing, thus disenfranchising the RAC service manager with operating system specific frameworks or vendor centric applications. SD multipath agent 162 can consume data and provide configuration data for OS specific SD multipath agents 162 based on vendor-specific best practices.

SI multipath agent 168 writes the multipathing configuration details to a preset location in persistent storage within the eMMC 160. When launched, the SI multipath agent 168 looks for multipathing configuration. When the SI multipath agent 168 does not find an existing multipathing configuration in SDMC file(s) 164 stored on the eMMC 160, the SI multipath agent 168 checks to see if multipathing has been already configured on the host. If multipathing is already configured, the SI multipath agent 168 finds SDMC file(s) 164 on the host. The SI multipath agent 168 via the RAC service manager 172 imports SDMC file(s) 164 to create SIMC file(s) 166. The SI multipath agent 168 stores the SIMC file(s) 166 in system memory 114, local to the operating System 122. If neither SDMCs nor SIMCs files 164, 166 are found, the SI multipath agent 168 starts the multipathing configuration process, creating SIMC and SDMC files 164, 166, and notifies host multipathing framework, such as SD multipath agent 162, to consume SDMC file(s) 164. Once the SDMC and SIMC files 164, 166 are created, the SI multipath agent 168 continuously monitors the hardware for a change. The SI multipath agent 168 also monitors for any policy change that would affect the multipath configuration. The SI multipath agent 168 keeps the SDMC and SIMC files 164, 166 in synchronization in response to any changes. The SI multipath agent 168 monitors SDMC file(s) 164 for any changes and periodically imports those changes to SIMC file(s) 166.

Figure 2:
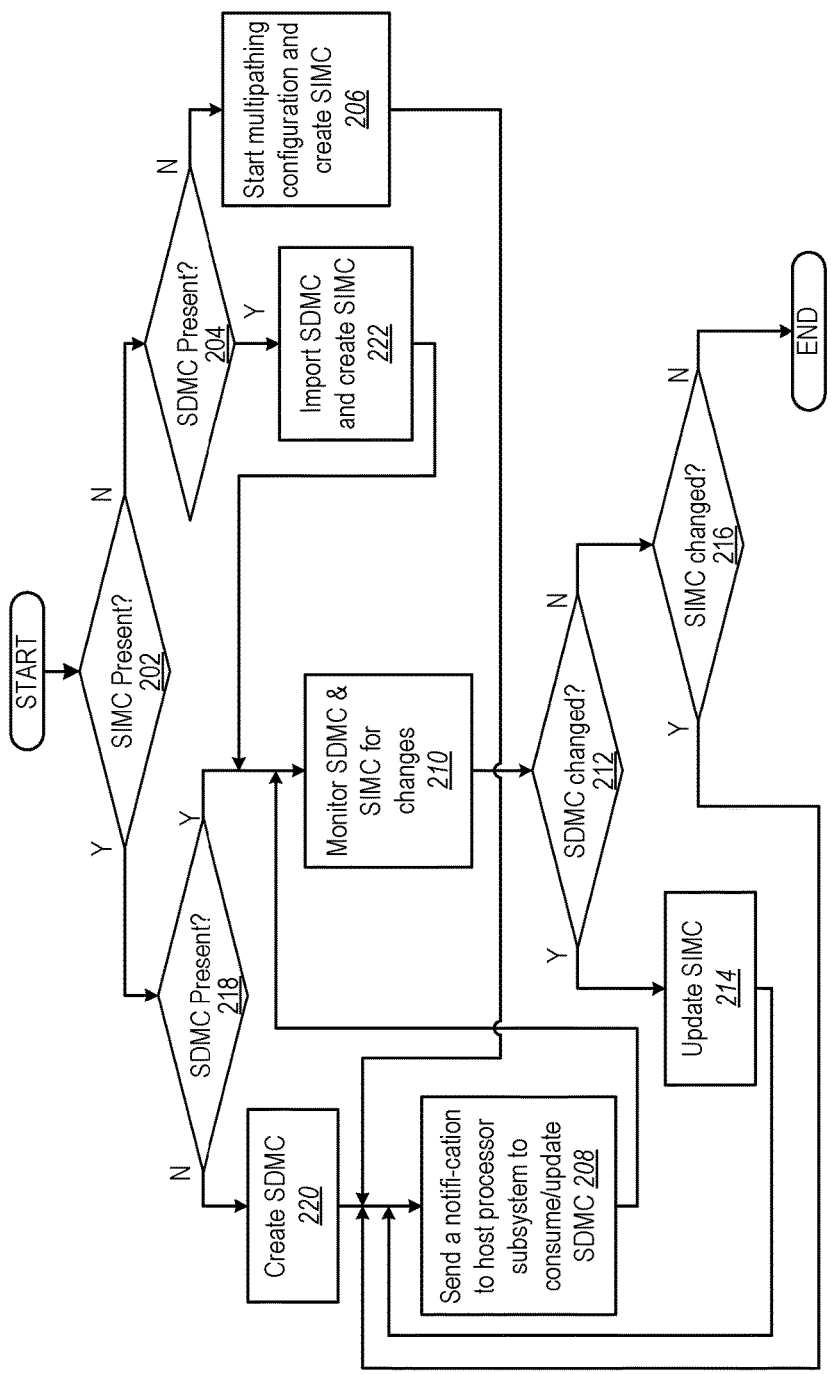
FIG. 2 illustrates a flow diagram representation of managing multipath configurations in a datacenter using a remote access controller (RAC) service module, according to one or more embodiments.
Figure 3A:
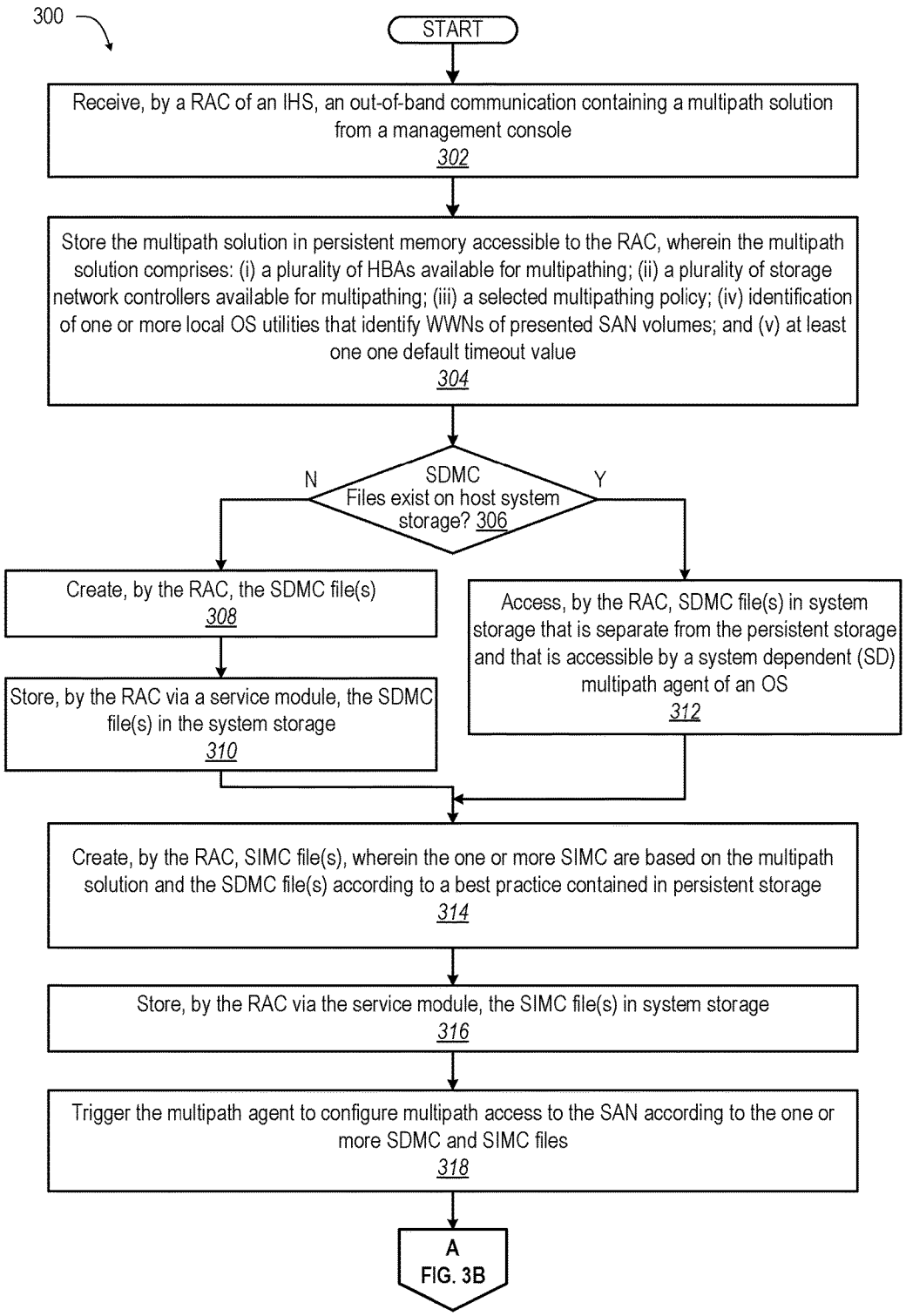
FIGS. 3A-3B illustrate a flow diagram representation of a method of remotely triggering local configuration of an IHS to adaptively access a multipath SAN, according to one or more embodiments.
Figure 3B:
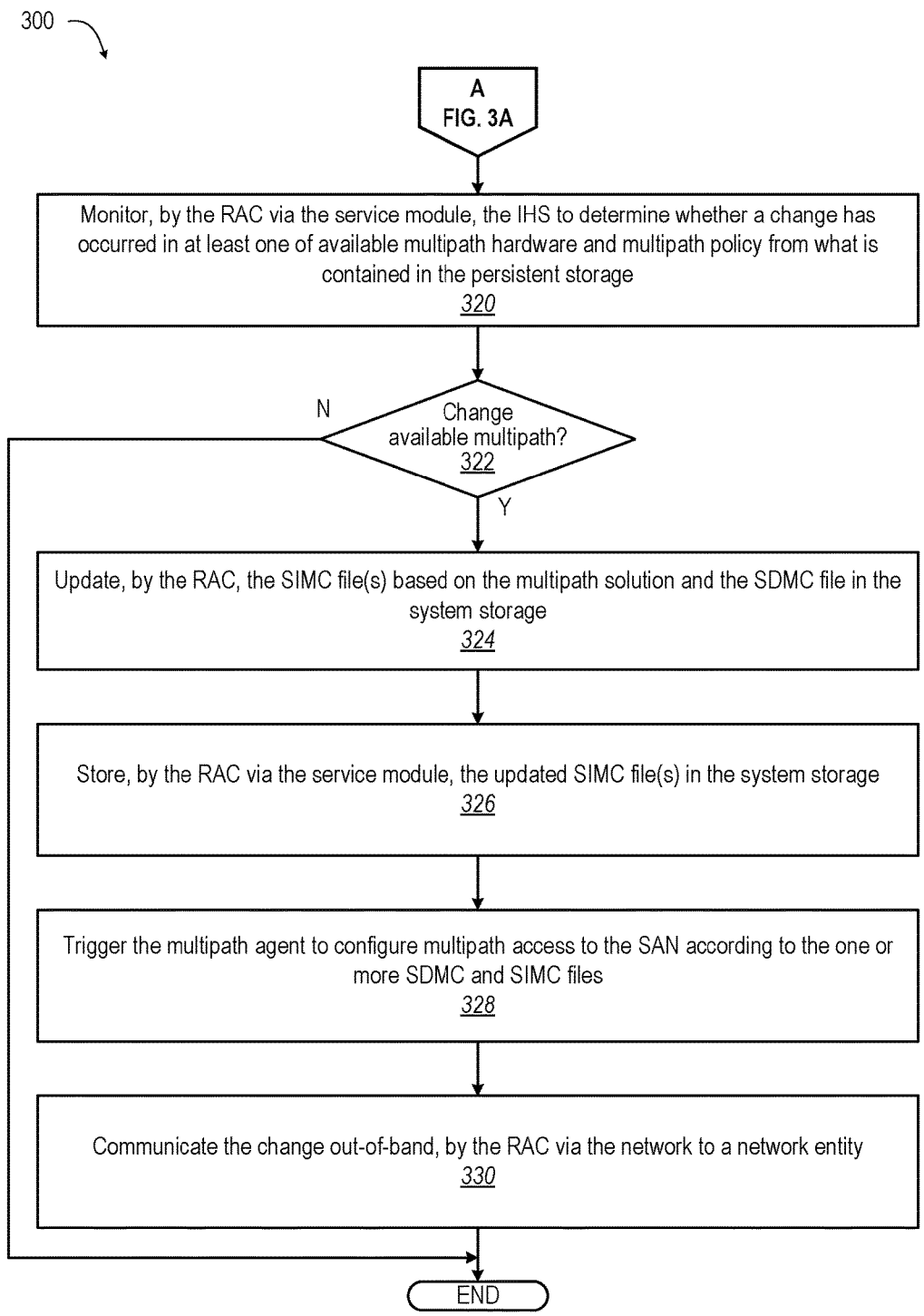

FIGS. 2 and 3A-3B illustrate flowcharts of exemplary methods 200, 300 by which host processor subsystem 112 (FIG. 1) and/or RAC 154 (FIG. 1) performs different aspects of the processes that enable the one or more embodiments of the disclosure. Generally, methods 200, 300 represent computer-implemented methods. The description of methods 200, 300 is provided with general reference to the specific components illustrated within FIG. 1.

FIG. 2 illustrates a method 200 of managing multipath configurations in a datacenter using a remote access controller (RAC) service manager. For clarity, method 200 is directed to activities of the RAC service module that is already provisioned with a multipath solution. Remote updating of the multipath solution via the RAC is illustrated in FIG. 3 and described below. Returning to FIG. 2, in one or more embodiments, method 200 begins at start block and proceeds to decision block 202 with RAC service manager determining whether SIMC file is present. In response to determining that SIMC file is not present, method 200 includes determining whether SDMC file is present (decision block 204). In response to determining that the SDMC file is not present, the RAC service manager starts multipathing configuration and prompts the RAC to create a SIMC file (block 206). Method 200 includes sending a notification by RAC service manager to the host processor subsystem to consume and update SDMC (block 208). In particular, the SD multipath agent reads and processes the SDMC file(s) and stores an updated version of the SDMC file(s). RAC service manager monitors SDMC and SIMC for changes (block 210). A determination is made, by the RAC service manager, whether the SDMC file is changed (decision block 212). In response to determining that the SDMC file is changed, the method 200 includes the RAC service manager updating the SIMC (block 214). Then method 200 returns to block 208 to trigger the host to update the SDMC file. Returning to decision block 212, in response to determining that the SDMC file has not changed, the RAC service manager determines whether the SIMC file is changed (decision block 216). In response to determining that the SIMC is changed, method 200 returns to block 208 to trigger the host to update the SDMC file. In response to determining that the SIMC has not changed, method 200 ends.

Returning to decision block 202, in response to determining that the SIMC file is present, the RAC service manager determines whether the SDMC file is present (decision block 218). In response to the SDMC file not being present, the service manager prompts the RAC to create a SDMC file (block 220). Then method 200 proceeds to block 208 to trigger the host to update the SDMC file. Returning to decision block 212, in response to determining that the SDMC file is present, method 200 proceeds to block 210 to monitor for changes to the SDMC and SIMC files. Returning to decision block 204, in response to determining that the SDMC file is present after previously determining that the SIMC is not present, the RAC service manager facilitates importing of the SDMC file by the RAC and creation of the SIMC file (block 222). Then method proceeds to block 210 to monitor SDMC and SIMC files for changes, which in this instance will be triggered by the creation of the SIMC file. With this approach, a system administrator can configure multipathing on any supported operating system without understanding the nuances of a specific operating system.

FIGS. 3A-3B illustrate an exemplary method 300 of performing local configuration of an IHS following receipt of a remote trigger to adaptively access a multipath SAN. In one or more embodiments, the method 300 begins at the start block and proceeds to block 302, which provides the RAC of an IHS receiving an out-of-band communication containing a multipath solution from a management console (block 302). In block 304, the RAC stores the multipath solution in persistent memory accessible to the RAC. The multipath solution includes: (i) a plurality of HBAs available for multipathing; (ii) a plurality of storage network controllers available for multipathing; (iii) a selected multipathing policy; (iv) identification of one or more local OS utilities that identify WWNs of presented SAN volumes; and (v) at least one default timeout value. Method 300 includes determining whether SDMC file(s) exists on the host in the system storage (decision block 306). In response to determining that no SDMC files exist in the system storage, the method 300 includes creating, by the RAC, the SDMC file(s) (block 308). The RAC, via a service module, stores the SDMC file(s) in the system storage (block 310).

Returning to decision block 306, in response to determining that SDMC files do exist in the system storage, method 300 includes accessing, by the RAC, SDMC file(s) in system storage that is separate from the persistent storage and that is accessible by a system dependent (SD) multipath agent of an OS (block 312). Subsequent to the SDMC file(s) being created and stored in blocks 308, 310 or accessed in block 312, the RAC creates SIMC file(s). The one or more SIMC files are based on the multipath solution and the SDMC file(s) according to a best practice contained in persistent storage (block 314). Method 300 includes storing, by the RAC via the service manager, the SIMC file(s) in system storage (block 316). Method 300 includes triggering the multipath agent to configure multipath access to the SAN according to the one or more SDMC and SIMC files (block 318).

RAC, via the service module, monitors the IHS to determine whether a change has occurred in at least one of: (i) available multipath hardware; and (ii) multipath policy (block 320). The determination can be based upon a comparison of SDMC and SIMC files maintained in system storage to copies previously stored in persistent storage that is accessed by the RAC. The host processor subsystem can make changes to the SDMC and SIMC files maintained in system storage. A determination is made by the RAC, whether the change affects an available multipath to the SAN for the IHS specified in the SDMC file (decision block 322). In response to determining that the change affects the available multipath, method 300 includes updating, by the RAC, the SIMC file(s) based on the multipath solution and the SDMC file in the system storage (block 324). The RAC, via the service module, stores the updated SIMC file(s) in the system storage (block 326). Method 300 includes triggering the multipath agent to configure multipath access to the SAN according to the one or more SDMC and updated SIMC files (block 328). The RAC communicates the change out-of-band via the network to a network entity (block 330). Then method 300 ends. Returning to decision block 322, in response to determining that the change does not affect the available multipath, method 300 ends.

The present innovation introduces out-of-band (OOB) monitoring of the multipath configuration by execution at the BMC level. The present innovation also provides automated multipath configuration as per best practices as appropriate for different OS and storage vendors. In addition, the present innovation simplifies implementation of multipath configuration in a datacenter environment. The best practices for deploying multipath configuration vary significantly depending on the type of storage array being presented. Presenting a multipathing solution at BMC level enables a single window of multipathing configuration. Training requirements for system administrators is reduced for configure multipathing due to provisioning the automated solution with the best practices.

In the above described flow charts of FIGS. 2 and 3A-3B, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magnetooptically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
    a network interface in communication with a management console via a network;
    system storage;
    a host processor subsystem in communication with the network interface and the system storage and which executes a system dependent (SD) multipath agent of an operating system to configure multipath access to a storage area network (SAN) according to one or more system dependent multipath configuration (SDMC) files and any system independent multipath configuration (SIMC) files contained in the system storage; and
    a remote access controller (RAC) service module comprising:
        a persistent storage that is separate from the system storage; and
        a remote access controller (RAC) coupled to the persistent storage, the system storage via a RAC service manager executed by the host processor subsystem, and the network interface to perform out-of-band processing for the IHS and comprising a service processor which executes a system independent (SI) multipath agent that causes the RAC to:
            receive an out-of-band communication containing a multipath solution from the management console;
            store the multipath solution in the persistent memory;
            access the one or more SDMC files in the system storage;
            create the one or more SIMC files based on the multipath solution and the one or more SDMC files;
            store the one or more SIMC files in the system storage; and
            trigger the SD multipath agent to configure access to the SAN according to the one or more SDMC and SIMC files.

2. The IHS of claim 1, wherein the multipath solution comprises: (i) a plurality of host bus adapters (HBAs) available for multipathing; (ii) a plurality of storage network controllers available for multipathing; (iii) a selected multipathing policy; (iv) identification of one or more local operating system (OS) utilities that identify World Wide Names (WWNs) of presented SAN volumes; and (v) at least one default timeout value.

3. The IHS of claim 1, wherein the SI multipath agent of the RAC configures the RAC to:
    determine whether one or more SDMC files exists in the system storage; and
    in response to determining that the no SDMC files exist in the system storage:
        create the one or more SDMC files;
        store the one or more SDMC files in the system storage; and
        trigger the SD multipath agent to configure multipath access to the SAN according to the one or more SDMC files.

4. The IHS of claim 1, wherein the SI multipath agent configures the RAC to:
    monitor the IHS to determine whether a change has occurred in at least one of available multipath hardware and multipath policy from what is contained in the persistent storage;
    in response to determining that the change affects an available path to the SAN for the IHS specified in the SDMC file:
        update the one or more SIMC files based on the multipath solution, the change, and the SDMC file; and
        store the updated one or more SIMC files in the system storage.

5. The IHS of claim 4, wherein the RAC communicates the change via the network to a network entity, in response to determining that the change has occurred to the available multipath.

6. The IHS of claim 1, wherein the RAC creates the one or more SIMC files by implementing the multipath solution according to a best practice contained in persistent storage.

7. A method of configuring an Information Handling System (IHS) to adaptively access a multipath storage area network (SAN), the method comprising:
    receiving, by a remote access controller (RAC) of the IHS, an out-of-band communication containing a multipath solution from a management console;
    storing the multipath solution in persistent memory accessible to the RAC;
    accessing one or more system dependent multipath configuration (SDMC) files in system storage that is separate from the persistent storage and that is accessible by a system dependent (SD) multipath agent of an operating system;

creating, by the RAC, one or more system independent multipath configuration (SIMC) files based on the multipath solution and the one or more SDMC files;

storing the one or more SIMC files in the system storage; and triggering a SD multipath agent to configure access to the SAN according to the one or more SDMC and SIMC files.

8. The method of claim 7, wherein the multipath solution comprises: (i) a plurality of host bus adapters (HBAs) available for multipathing; (ii) a plurality of storage network controllers available for multipathing; (iii) a selected multipathing policy; (iv) identification of one or more local operating system (OS) utilities that identify World Wide Names (WWNs) of presented storage area network (SAN) volumes; and (v) at least one default timeout value.

9. The method of claim 7, further comprising:
determining whether one or more SDMC files exists in the system storage; and
in response to determining that no SDMC files exist in the system storage:
creating, by the RAC, the one or more SDMC files;
storing the one or more SDMC files in the system storage; and
triggering the SD multipath agent to configure multipath access to the SAN according to the one or more SDMC and SIMC files.

10. The method of claim 7, further comprising:
monitoring, by the RAC, the IHS to determine whether a change has occurred in at least one of available multipath hardware and multipath policy from what is contained in the persistent storage;
in response to determining that the change affects an available multipath to the SAN for the IHS specified in the SDMC file:
updating, by the RAC, the one or more SIMC files based on the multipath solution and the SDMC file in the system storage; and
storing the updated one or more SIMC files in the system storage.

11. The method of claim 10, further comprising communicating, out-of-band, the change, via the network to a network entity, in response to determining that the change has occurred to the available multipath.

12. The method of claim 7, wherein creating the one or more SIMC files further comprises implementing the multipath solution by the RAC according to a best practice contained in persistent storage.

13. A remote access controller (RAC) service module of an information handling system (IHS), the RAC service module comprising:
a persistent storage that is separate from a system storage of the IHS; and
a remote access controller (RAC) coupled to: (i) the persistent storage; (ii) a system storage via a RAC service manager executed by a host processor subsystem of the IHS; and (iii) a network interface of the IHS to perform out-of-band processing for the IHS, the RAC comprising a service processor which executes a system independent (SI) multipath agent that causes the RAC to:
receive an out-of-band communication containing a multipath solution from a management console over a network via the network interface;
store the multipath solution in the persistent memory;
access the one or more system dependent multipath configuration (SDMC) files in the system storage;
create the one or more system independent multipath configuration (SIMC) files based on the multipath solution and the one or more SDMC files;
store the one or more SIMC files in the system storage; and
trigger a SD multipath agent of a host operating system and executed by the host processor subsystem to configure access to a storage area network (SAN) according to the one or more SDMC and SIMC files.

14. The RAC of claim 13, wherein the multipath solution comprises: (i) a plurality of host bus adapters (HBAs) available for multipathing; (ii) a plurality of storage network controllers available for multipathing; (iii) a selected multipathing policy; (iv) identification of one or more local operating system (OS) utilities that identify World Wide Names (WWNs) of presented SAN volumes; and (v) at least one default timeout value.

15. The RAC of claim 13, wherein the SI multipath agent:
determines whether one or more SDMC files exists in the system storage; and
in response to determining that no SDMC files exist in the system storage:
creates, by the RAC, the one or more SDMC files;
stores the one or more SDMC files in the system storage via the RAC service manager; and
triggers the SD multipath agent to configure multipath access to the SAN according to the one or more SDMC and SIMC files.

16. The RAC of claim 13, wherein the SI multipath agent:
monitors the IHS to determine whether a change has occurred in at least one of available multipath hardware and multipath policy that affects an available path to the SAN for the IHS;
in response to determining, by the RAC, that the change affects an available path to the SAN:
updates the one or more SIMC files based on the multipath solution, the change, and the SDMC file; and
stores the updated one or more SIMC files in the system storage.

17. The RAC of claim 16, wherein the SI multipath agent out-of-band communicates the change via the network to a network entity in response to determining that the change has occurred to the available multipath.

18. The RAC of claim 13, wherein the SI multipath agent creates the one or more SIMC files by implementing the multipath solution according to a best practice contained in persistent storage.

* * * * *